INVENTOR.
Marshall W. Baker
Charles F. Henney
Hal C. Johnston
BY *Willits, Hardman & Fehr*.
Attorneys

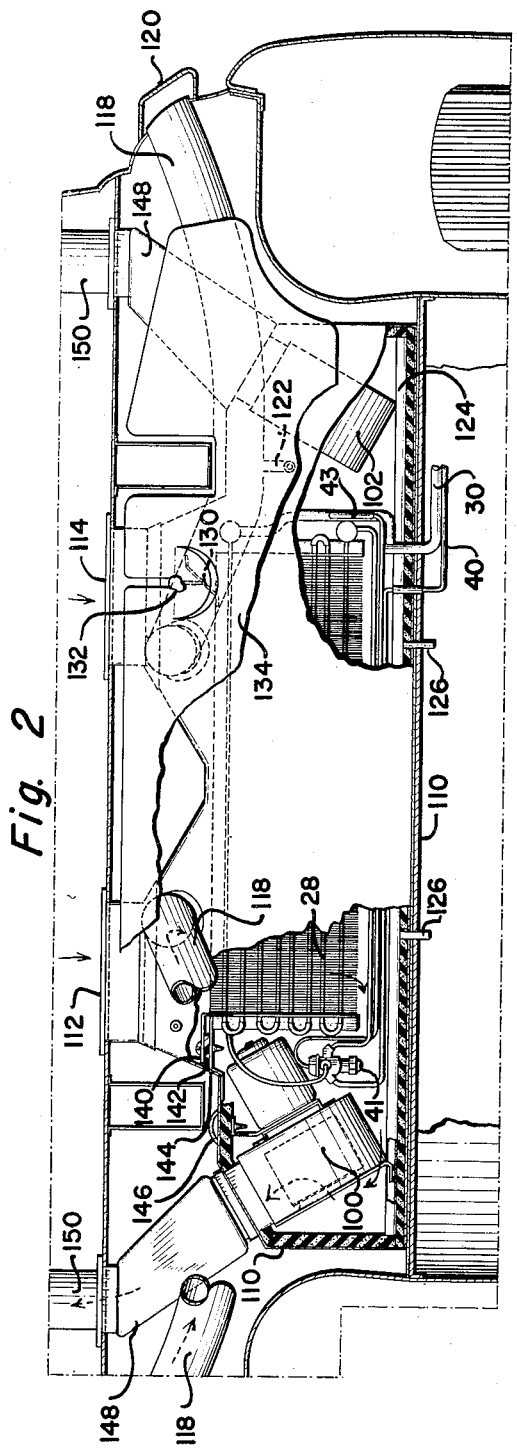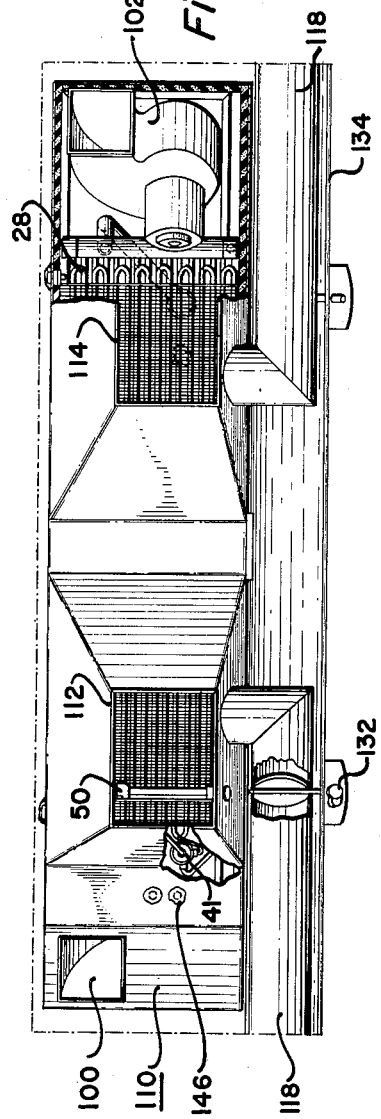

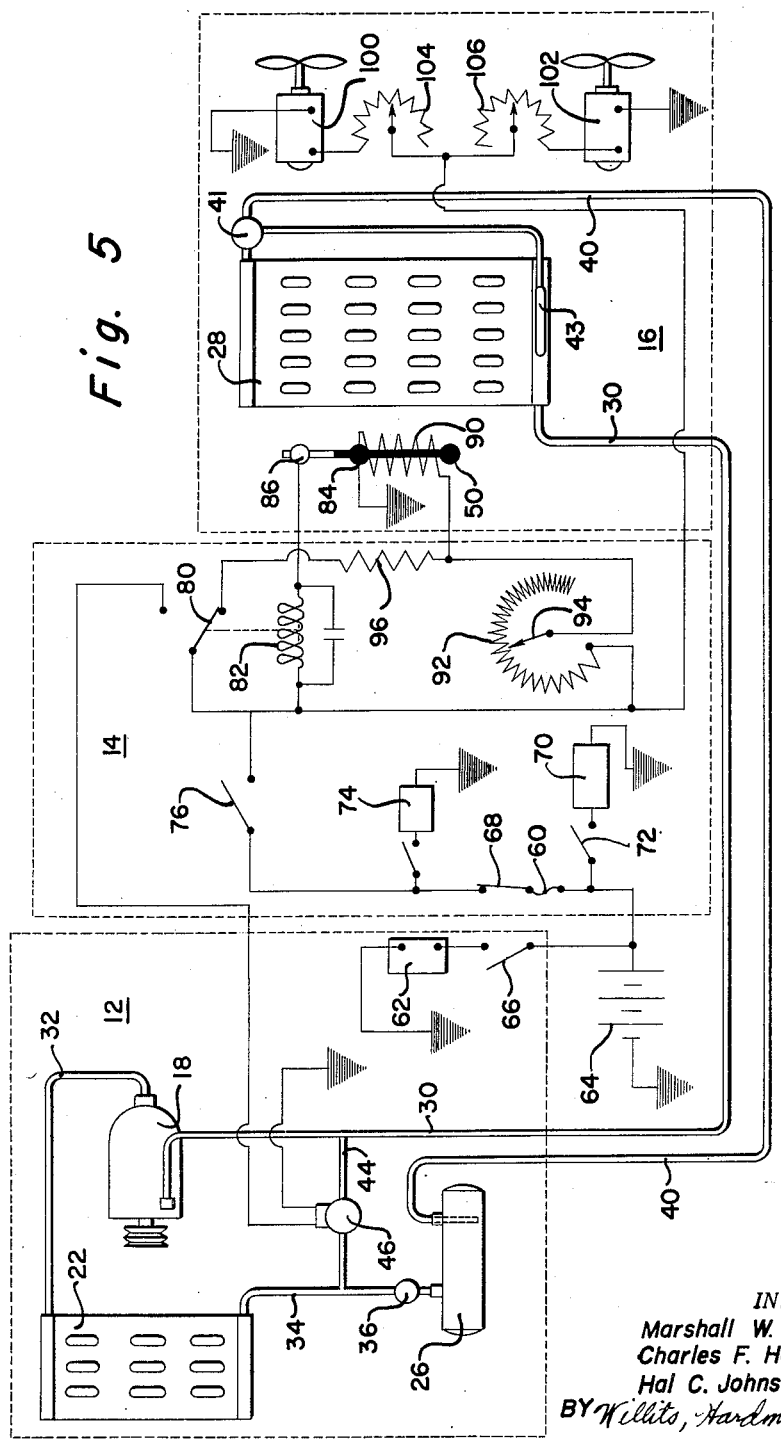

2,779,162
Patented Jan. 29, 1957

2,779,162
AUTOMOBILE REFRIGERATING APPARATUS

Marshall W. Baker, Charles F. Henney, and Hal C. Johnston, Dayton, Ohio, assignors to General Motors Corporation, Detroit, Mich., a corporation of Delaware Application December 4, 1952, Serial No. 324,082

5 Claims. (Cl. 62—4)

This invention relates to refrigerating apparatus and more particularly to an automobile air conditioning system.

It is an object of this invention to provide a fully automatically controlled air conditioning system which may be manufactured at a low cost.

Another object of this invention is to provide a system which is efficient in operation and requires a minimum amount of servicing.

Still another object of this invention is to provide an automobile air conditioning system having an improved arrangement for introducing fresh air.

Further objects and advantages of the present invention will be apparent from the following description, reference being had to the accompanying drawings, wherein a preferred form of the present invention is clearly shown.

In the drawings:

Figure 2 is a rear elevational view with parts broken away showing the location and arrangement of parts within the trunk compartment of the car;

Figure 3 is a plan view with parts broken away showing the construction and arrangement of the cooling unit disposed within the trunk compartment of the car;

Figure 1:
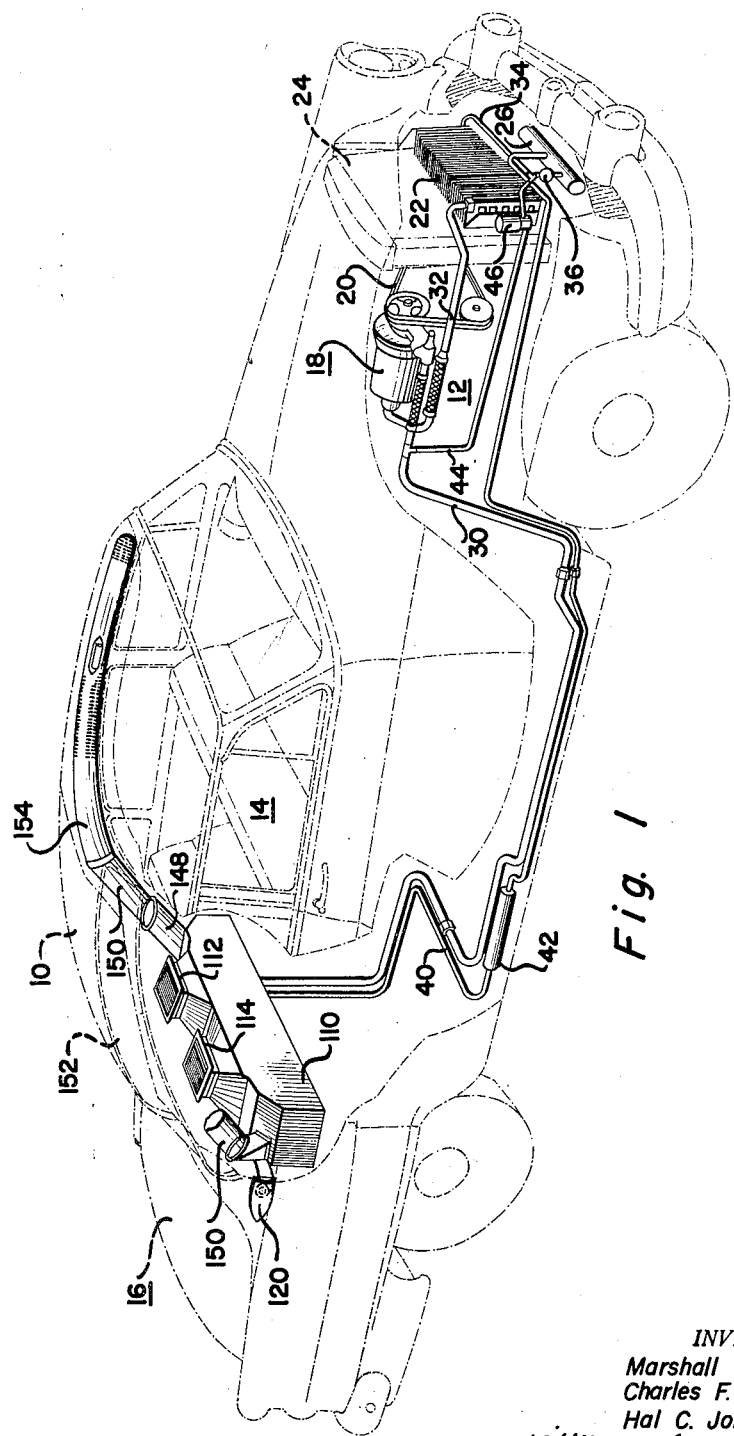
Figure 1 is a pictorial view partly in phantom and with parts broken away showing the arrangement of parts within the automobile.
Figure 4:
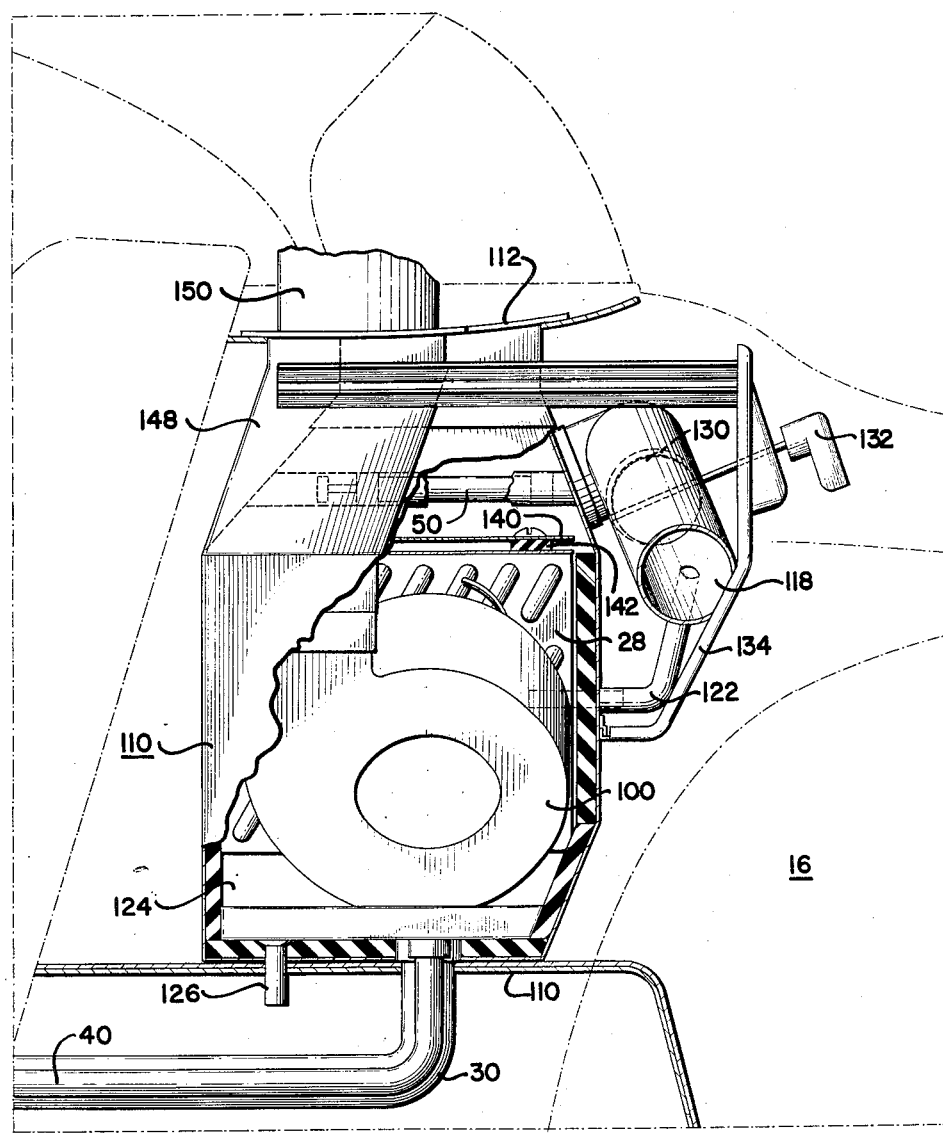
Figure 4 is an end elevational view with parts broken away showing the structure of Figures 2 and 3; and, Figure 5 is a diagrammatic view showing the controls for the air conditioning unit.

Referring now to the drawings wherein there is shown a preferred embodiment of the invention, reference numeral 10 designates a conventional passenger automobile having an engine compartment 12, a passenger compartment 14 and a luggage compartment 16. For purposes of illustrating the invention there is shown a conventional five passenger four-door sedan whereas the invention is equally applicable to various other types and styles of passenger cars.

The refrigerant system which is used for cooling the air consists of a compressor 18 directly driven by the car engine by means of a belt 20, a condenser 22 and receiver 26, located in front of the engine radiator 24, and an evaporator 28 located in the trunk compartment of the car. The compressor 18 withdraws vaporized refrigerant from the evaporator through the suction line 30 and discharges the compressed refrigerant into the condenser 22 through the line 32. The refrigerant condenses within the condenser element 22 and discharges into a line 34 which leads to the receiver 26. A check valve 36 is provided in the refrigerant line 34 and permits free flow of liquid refrigerant from the condenser to the receiver but prevents the reverse flow of refrigerant. Liquid refrigerant flows from the receiver 26 to the evaporator through a liquid line 40 which is arranged in thermal exchange relationship with the suction line 30 throughout a portion of its length. The flow of refrigerant into the evaporator is controlled by the thermostatic expansion valve 41 having the control bulb 43 at the outlet of the evaporator. A suitable filter and dryer cartridge 42 is provided in the liquid line so as to remove any moisture or dirt particles which may enter the system.

A by-pass line 44 is provided between the inlet of the compressor and the line 34 which leads from the condenser to the receiver. The by-pass line 44 connects to the line 34 ahead of the check valve 36 whereby the check valve prevents the flow of liquid refrigerant from the receiver into the by-pass line. A normally open solenoid valve 46 is provided in the by-pass line 44 whereby the refrigerant is free to flow from the outlet of the condenser directly back to the inlet of the compressor at all times when the solenoid valve 46 is deenergized. As will be explained more fully hereinafter the valve 46 is controlled by means of a thermostat 50 located directly above the evaporator in the return air stream and this thermostat serves to energize the solenoid 46 whenever refrigeration is required so as to prevent the by-passing of refrigerant from the outlet of the condenser to the inlet of the compressor.

The above described type of by-pass arrangement not only serves to unload the compressor when no refrigeration is required but also serves as a convenient means of cooling the compressor as it operates under no load. As explained hereinabove the compressor is connected directly to the main car engine by means of the belt 20 and normally operates at all times that the engine operates irrespective of refrigeration. The belt 20 may be removed during the winter season to prevent needless wear on the belt and the compressor. By connecting the by-pass 44 ahead of the check valve 36 it is obvious that upon opening of the by-pass 46 none of the liquid refrigerant from the receiver is allowed to enter the by-pass line. Any liquid refrigerant which may be in the condenser when the solenoid valve 46 opens the by-pass will obviously be subjected to a pressure corresponding to the suction pressure and since this pressure is materially lower than the condensing pressure any liquid refrigerant in the condenser will normally flash into vapor before it enters the compressor 18. Any minor amount of liquid refrigerant which might find its way into the compressor will come in contact with the relatively hot compressor parts and will flash into vapor before having a chance to damage the compressor.

By virtue of the fact that the solenoid valve 46 is a normally open valve it is obvious that the only time any current is required for holding the valve open is when the car is in operation and refrigeration is required. Thus, the valve 46 will not constitute a drain on the car storage battery during the winter season. Furthermore the arrangement is such that in the event the fuse 60 (see Figure 7) serving the air conditioning equipment should blow, the solenoid valve would not remain in the closed position.

In the circuit arrangement shown in Figure 5, reference numeral 70 designates that portion of the electrical load such as the lights. Reference numeral 72 designates a switch for controlling the operation of the lights. The reference numeral 74 has been used to designate such equipment as the radio, cigaret lighter and other equipment. Reference numeral 64 designates the usual car storage battery which supplies power for the electrical equipment on the car, in accordance with standard practice.

The air conditioning equipment may be turned on and off by means of a master switch 76 which is preferably located on the dashboard so as to be readily accessible to the driver of the car. Whenever the switches 68 and 76 are in the closed position, the solenoid valve 46 is under control of a switch 80 which in turn is under control of the solenoid 82 arranged in series circuit relationship with the main thermostat 50. The thermostat 50 is of the mercury tube type which automatically serves to close the circuit to the solenoid 82 when the mercury bridges between the contacts 84 and 86 which are arranged as shown. A heater 90 is arranged in thermal exchange relationship to a portion of thermostat 50 so as to provide for controlled regulation of the temperature at which the thermostat 50 closes the circuit. The heater 90 is arranged in series with a hand controlled rheostat 92 which is preferably located on the instrument panel of the car so as to enable the driver of the car to regulate the setting of the rheostat 92 and thereby regulate the flow of current to the heater 90. It will be noted that the resistance of the rheostat 92 is unevenly distributed. The purpose of this uneven distribution of the resistance in the rheostat 92 is to make it possible to provide for equal temperature change throughout equal increments of movement of the hand operated rheostat slide 94.

It should be noted that when the solenoid 82 is de-energized the switch 80 closes a circuit through a resistance element 96 which allows a predetermined flow of current through the heater element 90 irrespective of the position of the rheostat regulator 94. The purpose of this is to decrease the temperature differential required to restart the cooling cycle by adding a given amount of heat to the thermostat 50 during the off cycle. By virtue of this construction the temperature of the air within the conditioned space will not be required to rise as much before turning on the cooling again. A pair of fans or blowers 100 and 102 are provided for circulating the air to be conditioned over the evaporator. These blowers are connected in the circuit as shown through rheostats 104 and 106 respectively whereby it is possible to independently control the speed of each of these blowers.

Referring now to Figures 2 through 6 which show the evaporator and air distributing ducts it will be noted that the evaporator is mounted in a housing 110 which is adapted to be mounted within the luggage compartment of the car directly beneath the package shelf at the rear of the back seat of the car. This housing is considerably longer than the evaporator 28 so as to provide space at the opposite ends of the evaporator 28 for the blowers 100 and 102 respectively. Air from the passenger compartment enters the upper portion of the housing 110 through a pair of air inlets 112 and 114 arranged as shown.

In order to make it possible to introduce fresh air into the passenger compartment a pair of fresh air ducts 118 have been provided as shown. These fresh air ducts communicate with air scoops 120 located on opposite sides of the car directly above the rear fender as best shown in Figures 1 and 2. Inasmuch as these air scoops will at times be exposed to rain or snow they have been arranged at a high enough elevation so that the water which would tend to collect in the duct would enter a drain 122 at a low point in the fresh air duct so as to cause the water to be discharged into the evaporator housing 110 at the sides of the evaporator 28. A condensate collecting pan 124 in the bottom of the evaporator housing 110 serves to collect this water along with any condensate water and discharge it through suitable drains 126 which lead down beneath the car. In order to control the quantity of fresh air introduced through each of the fresh air ducts 118 a damper 130 is mounted in each of the ducts. The outlets from the fresh air ducts 118 are located directly above the evaporator 28 with the result that the incoming fresh air is required to flow down over the evaporator 28 before being picked up by the air distributing fans 100 and 102. A baffle or guard 134 is mounted directly behind the fresh air ducts 118 so as to protect these ducts from being hit by baggage and the like which may be placed within the trunk compartment of the car.

The evaporator is suspended within the compartment or housing 110 by means of mounting brackets 140 provided at the ends of the evaporator. In order to prevent the transfer of heat from the air in the baggage compartment to the evaporator 28, heat insulating grommets 142 are provided as shown between the evaporator brackets 140 and the bracket 144 carried by the housing 110. The heads of any mounting bolts which may project through the walls of the housing 110 are coated with a heat insulating plastic 146 as shown in Figure 2 so as to prevent sweating on the outer portion of the evaporator housing 110. The fans 100 and 102 discharge into duct sections 148 which lead from the housing 110 to outlets at the ends of the package shelf. Any suitable air distributing ducts may be provided for conveying air from these outlets to the upper portion of the car. In the preferred arrangement transparent duct sections 150 are provided directly above the package shelf opposite the rear window 152 so as to prevent obstruction to the sight at the points where the ducts pass in front of the rear window. The conditioned air may be distributed within the passenger compartment through a pair of similar air distributing ducts 154 located along the sides of the passenger compartment as best shown in Figure 1 of the drawings.

While the form of embodiment of the invention as herein disclosed constitutes a preferred form, it is to be understood that other forms might be adopted, as may come within the scope of the claims which follow.

What is claimed is as follows:

1. In combination; a vehicle having a passenger compartment, an engine compartment, a luggage compartment, and an engine for supplying power for operating said vehicle; a compressor having an inlet and an outlet; power transmitting means between said compressor and said engine; a condenser; means for conveying compressed refrigerant from the outlet of said compressor to said condenser; an evaporator; means for supporting said evaporator within said luggage compartment; refrigerant flow means for connecting said condenser to said evaporator; means for connecting the outlet of said evaporator to the inlet of said compressor; by-pass means for connecting the outlet of said condenser to the inlet of said compressor; a valve in said by-pass means; condensate collecting means disposed beneath said evaporator; and means for conveying air to be conditioned in thermal exchange relationship with said evaporator; said last named means including an air duct having an inlet scoop exposed to fresh air and an outlet for discharging the fresh air into thermal exchange relationship with said evaporator; means for controlling the flow of fresh air introduced by said scoop; means for discharging rain water or the like which may enter said scoop into said condensate collecting pan; and means repsonsive to the temperature of a portion of said air to be conditioned for controlling the said valve in said by-pass means.

2. In combination; a vehicle having a passenger compartment, an engine compartment, a luggage compartment, and an engine for supplying power for operating said vehicle; a compressor having an inlet and an outlet; power transmitting means between said compressor and said engine; a condenser; means for conveying compressed refrigerant from the outlet of said compressor to said condenser; an evaporator; means for supporting said evaporator within said luggage compartment; refrigerant flow means for connecting said condenser to said evaporator; means for connecting the outlet of said evaporator to the inlet of said compressor; by-pass means for connecting the outlet of said condenser to the inlet of said compressor; a valve in said by-pass means, condensate collecting means disposed beneath said evaporator; and means for conveying air to be conditioned in thermal exchange relationship with said evaporator; said last named means including an air duct having an inlet exposed to fresh air and an outlet for discharging the fresh air into thermal exchange relationship with said evaporator; means for controlling the flow of fresh air introduced by said scoop; means for discharging rain water or the like which may enter said scoop into said condensate collecting pan; means responsive to the temperature of a portion of said air to be conditioned for controlling the said valve in said by-pass means, said air duct comprising a flexible duct located at the rear of said evaporator, and a shield adjacent said flexible duct for protecting said flexible duct from luggage in said luggage compartment.

3. In combination; an automobile having a passenger compartment, an engine compartment, and an engine for supplying power for operating said automobile; a compressor having an inlet and an outlet; power transmitting means between said compressor and said engine; a condenser; means for conveying compressed refrigerant from the outlet of said compressor to said condenser; an evaporator; refrigerant flow means for connecting said condenser to said evaporator; means for connecting the outlet of said evaporator to the inlet of said compressor; condensate collecting means disposed beneath said evaporator; and means for conveying air to be conditioned in thermal exchange relationship with said evaporator; said last named means including an air duct having an inlet scoop exposed to fresh air and an outlet for discharging the fresh air into thermal exchange relationship with said evaporator; means for controlling the flow of fresh air introduced by said scoop; and means for discharging rain water or the like which may enter said scoop into said condensate collecting pan; and means responsive to the temperature of a portion of said air to be conditioned for controlling the cooling of air by said evaporator.

4. In combination; an automobile having a passenger compartment, an engine compartment, and an engine for supplying power for operating said automobile; a compressor having an inlet and an outlet; power transmitting means between said compressor and said engine; a condenser; means for conveying compressed refrigerant from the outlet of said compressor to said condenser; an evaporator; refrigerant flow means for connecting said condenser to said evaporator; means for connecting the outlet of said evaporator to the inlet of said compressor; condensate collecting means disposed beneath said evaporator; and means for conveying air to be conditioned in thermal exchange relationship with said evaporator; said last named means including an air duct having an inlet scoop exposed to fresh air and an outlet for discharging the fresh air into thermal exchange relationship with said evaporator; means for controlling the flow of fresh air introduced by said scoop; and means for discharging rain water or the like which may enter said scoop into said condensate collecting pan.

5. In combination with an automobile having a variable speed engine for propelling the same and having a passenger compartment, a compressor, means drivingly connecting said compressor to said engine, an evaporator, a condenser, means connecting said evaporator, condenser and compressor into a closed refrigeration system, pressure reducing means between the outlet of said condenser and the inlet of said evaporator, means controlling the cooling of air by said system including a solenoid, a source of electrical power, means including a thermostatically operated switch for connecting said solenoid to said power source so as to render said system operative to cool air for said passenger compartment when cooling is required, means including a heater for varying the temperature at which said thermostatically operated switch connects said solenoid to said power source, and adjustable means for varying the heat output of said heater.

References Cited in the file of this patent

UNITED STATES PATENTS

| | | |
|---|---|---|
| 1,894,285 | Swezey | Jan. 17, 1933 |
| 2,180,760 | Mayo | Nov. 21, 1939 |
| 2,191,102 | Zerk et al. | Feb. 20, 1940 |
| 2,290,984 | McCoy | July 28, 1942 |
| 2,336,089 | Gould | Dec. 7, 1943 |
| 2,461,760 | Newton | Feb. 15, 1949 |
| 2,479,170 | Kuempl | Aug. 16, 1949 |